(12) United States Patent
Rolia et al.

(10) Patent No.: US 8,046,767 B2
(45) Date of Patent: Oct. 25, 2011

(54) SYSTEMS AND METHODS FOR PROVIDING CAPACITY MANAGEMENT OF RESOURCE POOLS FOR SERVICING WORKLOADS

(75) Inventors: Jerome Rolia, Fort Collins, CO (US); Ludmila Cherkasova, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1212 days.

(21) Appl. No.: 11/742,530

(22) Filed: Apr. 30, 2007

(65) Prior Publication Data
US 2008/0271039 A1    Oct. 30, 2008

(51) Int. Cl.
*G06F 9/46* (2006.01)
*G06F 15/173* (2006.01)

(52) U.S. Cl. ........ 718/104; 718/105; 709/223; 709/224; 709/225; 709/226

(58) Field of Classification Search .................... 718/104
See application file for complete search history.

(56) References Cited

U.S. PATENT DOCUMENTS

| | | | |
|---|---|---|---|
| 5,668,995 A | 9/1997 | Bhat | |
| 6,862,623 B1 | 3/2005 | Odhner et al. | |
| 6,898,564 B1 | 5/2005 | Odhner et al. | |
| 6,907,607 B1 * | 6/2005 | Mummert et al. | 718/104 |
| 7,002,960 B1 | 2/2006 | Golan et al. | |
| 7,082,441 B1 | 7/2006 | Zahavi et al. | |
| 7,117,118 B2 | 10/2006 | Kalos et al. | |
| 7,171,668 B2 | 1/2007 | Molloy et al. | |
| 7,552,208 B2 * | 6/2009 | Lubrecht et al. | 709/223 |
| 7,610,381 B2 * | 10/2009 | Cherkasova et al. | 709/226 |
| 7,640,342 B1 * | 12/2009 | Aharoni et al. | 709/226 |
| 7,698,710 B1 * | 4/2010 | Mummert et al. | 718/105 |
| 2002/0019869 A1 * | 2/2002 | Goldszmidt et al. | 709/224 |
| 2002/0152305 A1 * | 10/2002 | Jackson et al. | 709/224 |
| 2002/0198749 A1 | 12/2002 | Tomlin et al. | |
| 2003/0187970 A1 * | 10/2003 | Chase et al. | 709/223 |
| 2003/0225563 A1 | 12/2003 | Gonos | |
| 2004/0039815 A1 * | 2/2004 | Evans et al. | 709/225 |
| 2004/0181476 A1 * | 9/2004 | Smith et al. | 705/35 |
| 2004/0181794 A1 * | 9/2004 | Coleman et al. | 718/104 |
| 2005/0005012 A1 | 1/2005 | Odhner et al. | |
| 2005/0060389 A1 * | 3/2005 | Cherkasova et al. | 709/220 |
| 2005/0097560 A1 * | 5/2005 | Rolia et al. | 718/104 |
| 2005/0102121 A1 | 5/2005 | Odhner et al. | |
| 2005/0102318 A1 | 5/2005 | Odhner et al. | |
| 2005/0108380 A1 | 5/2005 | Odhner et al. | |
| 2005/0138170 A1 | 6/2005 | Cherkasova et al. | |
| 2005/0228879 A1 * | 10/2005 | Cherkasova et al. | 709/224 |
| 2005/0278439 A1 | 12/2005 | Cherkasova | |

(Continued)

OTHER PUBLICATIONS

Rolia et al., "Grids for Enterprise Applications", Springer-Verlag Berlin Heidelberg, 2003, p. 129-147.*

(Continued)

*Primary Examiner* — Jennifer To (57) ABSTRACT

A method comprises receiving, by a capacity management tool, a capacity management operation request that specifies a resource pool-level operation desired for managing capacity of a resource pool that services workloads. The capacity management tool determines, in response to the received request, one or more actions to perform in the resource pool for performing the requested capacity management operation in compliance with defined operational parameters of the workloads. The method further comprises performing the determined one or more actions for performing the requested capacity management operation.

14 Claims, 6 Drawing Sheets

U.S. PATENT DOCUMENTS

| | | |
|---|---|---|
| 2005/0278453 A1 | 12/2005 | Cherkasova |
| 2006/0013134 A1 | 1/2006 | Neuse |
| 2006/0089982 A1 | 4/2006 | Abbott et al. |
| 2006/0235664 A1 | 10/2006 | Vinberg et al. |
| 2007/0094379 A1* | 4/2007 | Stecher et al. ............ 709/224 |

OTHER PUBLICATIONS

Kalm, "Event-Driven Automation Get Real, Right Now", White Paper, Oct. 2006, pp. 1-5.*
U.S. Appl. No. 11/742,525, filed Apr. 30, 2007, Rolia et al.
U.S. Appl. No. 11/742,519, Rolia et al.
U.S. Appl. No. 11/684,569, Cherkasova et al.
U.S. Appl. No. 11/935,196, Cherkasova et al.
U.S. Appl. No. 11/546,632.
U.S. Appl. No. 11/492,738.
"Capacity Planning for WebLogic Portal," URL: http://edocs.bea.com/wlp/docs81/capacityplanning.html, May 21, 2007.
"The Workload for the SPECweb96 Benchmark," URL: http://www.spec.org/osg/web96/workload.html, Standard Performance Evaluation Corporation, May 21, 2007.
"TPC-W Benchmark," URL: http://www.tpc.org, Jun. 4, 2007.
Almeida, V., Bestavros, A., Crovella, M., de Oliveira, A., "Characterizing Reference Locality in the WWW," Technical Report, Boston University, TR-96-11, 1996.
Arlitt, M. and Williamson, C., "Web Server Workload Characterization: The Search for Invariants (Extended Version)," Department of Computer Science, University of Saskatchewan, 57 Campus Drive, Saskatoon, SK, Canada S7N 5A9, Mar. 15, 1996.
Arlitt, M. and Williamson, C., "Web Server Workload Characterization: The Search for Invariants," Department of Computer Science, University of Saskatchewan, SIGMETRICS '96 May 1996 PA, pp. 126-137.
Arlitt, M., Krishnamurthy, D., and Rolia, J., "Characterizing the Scalability of a Large Web-based Shopping System," ACM Transactions on Internet Technology, vol. 1, N 1, pp. 44-69, Aug. 2001.
Box, G.E.P., and G. Jenkins and G. Reinsel; "Time Series Analysis: Forecasting and Control:" Prentice Hall, Upper Saddle River, NJ, USA, 3rd Edition, 1994.
Chakravarti, I., Laha, R., and Roy, J. "Handbook of Methods of Applied Statistics," vol. I, John Wiley and Sons, pp. 392-394, 1967.
Chase, J.S., Anderson, D., Thakar, P., Vahdat, A. and Doyle, R., "Managing Energy and Server Resources in Hosting Centers," Department of Computer Science, Duke University.
Cherkasova, L. and Tang, L., "Sizing the Streaming Media Cluster Solution for a Given Workload," In Proc. of the 4th IEEE/ACM CCGrid 2004, Chicago, USA, Apr. 2004.
Draper, N. R. and H. Smith, "*Applied Regression Analysis;*" John Wiley & Sons, New York, NY, USA, 3rd Ed., 1998.
Engle, R.F., "Autoregressive Conditional Heteroscedasticity with Estimates of the Variance United Kingdom Inflation." Econometrica, 50(4): pp. 987-1008,1982.
Hartigan, J.A., Wong, M.A., "A K-Means Clustering Algorithm," *Applied Statistics*, vol. 28, pp. 100-108, 1979.
Jain. R., "The Art of Computer Systems Performance Analysis: Techniques for experimental Design, Measurement, Simulation, and Modeling," Wiley-Interscience, NY, 1991.
Kachigan, T.M., "A Multi-Dimensional Approach to Capacity Planning," In Proc. of CMG Conference 1980, Boston, MA, 1980.
Kelly, T. and Zhang, A., "Predicting Performance in Distributed Enterprise Applications," Hewlett-Packard Labs Tech Report, HPL-2006-76, May 2006.
Kelly T. "Detecting Performance Anomalies in Global Applications," Second Workshop on Real, Large Distributed Systems, WORLDS '2005, San Francisco, Ca., Dec. 2005.
Klerk, Land Bender, J., "Capacity Planning," URL: http://www.microsoft.com/technet/archive/itsolutions/ecommerce, Microsoft TechNet, 2000.
Menasce, D. Almeida, V., and Dowdy, L. "Capacity Planning and Performance Modeling: from Mainframes to Client-Server Systems," Prentice Hall, 1994.
Ranjan, S. and Rolia, J., Fu, H., and Knightly, E., "QoS-Driven Server Migration for Internet Data Centers," In Proc. of IWQoS 2002, Miami, FL, May 2002.
Rolia, J. and Vetland, V., "Correlating Resource Demand Information with ARM Data for Application Services," In Proc. of the ACM Workshop on Software and Performance, 1998.
Rolia, J., Cherkasova, L., Arlitt, M. and Andrzejak, A., "A Capacity Management Service for Resource Pools," In Proc. of the Fifth Intl. Workshop on Software and Performance, 2005.
Sarris, D. and Hofer, J., "Capacity Planning for e-Commerce Systems With Benchmark Factory." URL: http://www.dlt.com/quest/.
Urgaonkar, B., and G. Pacifici, P. Shenoy, M. Spreitzer, and A. Tantawi; "An Analytical Model for Multi-tier Internet Services and its Applications," In Proc. of the ACM SIGMETRICS'2005, Banff, Canada, Jun. 2005.
Urgaonkar, B., Shenoy, P., Chandra, A., and Goyal, P., "Dynamic Provisioning of Multi-tier Internet Applications," In Proc. of the 2nd IEEE International Conference on Autonomic Computing on (ICAC-05), Seattle, Jun. 2005.
Villela, D., Prashant, P., and Rubenstein, D., "Provisioning Servers in the Application Tier for E-Commerce Systems," In Proc. of IWQoS'04, Montreal, Canada, 2004.
Wimmer, M., and V. Nicolescu and D. Gmach and M. Mohr and A. Kemper and H. Kremar; "Evaluation of Adaptive Computing Concepts for Classical ERP Systems and Enterprise Services"; Proceedings of the IEEE Joint Conference on E-Commerce Technology and Enterprise Computing, E-Commerce and E-Services (CEC '06 and EEE '06); San Francisco, California, USA, Jun. 2006.

* cited by examiner

SYSTEMS AND METHODS FOR PROVIDING CAPACITY MANAGEMENT OF RESOURCE POOLS FOR SERVICING WORKLOADS

TECHNICAL FIELD

The following description relates generally to capacity management of resource pools for servicing workloads in accordance with defined operational parameters.

DESCRIPTION OF RELATED ART

Various computing environments exist in which computing workloads are supported/processed by the computing environment, and a desire generally exists for performing appropriate capacity planning for the computing environment to ensure that the environment has sufficient computing resources for adequately supporting an expected future workload. As a result of capacity planning, a determination may be made regarding whether and to what extent the computing environment's computing resources should be modified (e.g., increased), and/or a determination may be made regarding how many workloads to assign to a given resource of the computing environment. For instance, today computer systems are delivering (e.g., via computer networks, such as the Internet) a large array of business, government, and personal services. Similarly, mission critical operations, related to scientific instrumentation, military operations, and health services, are making increasing use of computer systems and computer networks for delivering information and distributed coordination. For example, many users are accessing service providers' computer systems via the Internet seeking such services as personal shopping, airline reservations, rental car reservations, hotel reservations, on-line auctions, on-line banking, stock market trading, as well as many other services being offered by service providers via computer networks, such as the Internet. Therefore, many service providers are competing in such electronic forum. Accordingly, it is important for such service providers (sometimes referred to as "content providers") to provide high-quality services. To do so, it has become desirable for such service providers to perform appropriate capacity planning to ensure that they can adequately service the demands placed on their systems by their clients in a desired manner (e.g., provide responses to requests in sufficiently fast time, etc., such as by serving responsive web pages to a requesting client within 8 seconds and/or satisfy some other quality of service target).

As information technology ("IT") and application infrastructures, such as those employed by the above-mentioned service providers for serving their clients, have become more complex, predicting and controlling the issues surrounding system performance and capacity planning have become a difficult (and sometimes overwhelming) task to many organizations. For larger IT projects, it is not uncommon for the cost factors related to performance tuning, performance management, and capacity planning to result in the largest and least controlled expense. Application performance issues have an immediate impact on customer satisfaction. A sudden slowdown of an enterprise-wide application can affect a large population of customers, can lead to delayed projects, and ultimately can result in company financial loss.

Many computing environments contain resource pools that may be shared for supporting a number of different workloads. In general, resource pools are collections of computing resources, such as clusters of servers, racks of blades, or other computing resources that offer shared access to computing capacity. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of resource capacity (e.g., CPU, memory, input/output). Various consumers (e.g., applications) may share access to the resources of a resource pool. That is, various consumers may share utilization of the resources in a resource pool for servicing their respective workloads. In this sense, a "Consumer" refers to anything (e.g., process, etc.) that consumes capacity of the pool's resources. Thus, a consumer has a corresponding workload that demands capacity of the computing resource(s). Accordingly, a consumer generally consumes capacity for use in servicing the consumer's workload. Thus, the consumer has a resource "demand" for capacity from the resource pool for servicing its workload in a desired manner. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. Resources in a pool have capacity attributes, e.g., CPU, memory, I/O operation rates, and bandwidths, each with limited capacity.

In the distant past, data centers were made up of small numbers of large mainframe computers that each hosted several application workloads with many users. Capacity planning experts helped to ensure that sufficient aggregate capacity was available just in time, as it was needed. With the advent of distributed computing, new application workloads were typically assigned to their own smaller servers. The incremental cost of capacity from smaller servers was much less expensive than the incremental cost of capacity on mainframes. Capacity planners would often anticipate an application's workload demands two years in advance and pre-provision a new server with sufficient capacity so that the workload could grow into it. However, the explosive growth in both enterprise computing and Internet computing has led to server sprawl in data centers. Enterprise data centers are typically full of large numbers of lightly utilized servers that incur high cost of ownership including facilities cost, such as rent and power for computing and cooling, high software licensing cost, and high cost for human management activities. Many enterprises are now beginning to exploit resource pools of servers supported by virtualization mechanisms that enable multiple application workloads to be hosted on each server. Different mechanisms have capabilities and characteristics that distinguish their purpose within data centers. Known virtual machine technologies, such as Xen, VMware, etc., enable configuration isolation, e.g., virtual machines may execute different operating systems and/or operating system versions while sharing the same physical host. Furthermore, some virtualization mechanisms (e.g., Xen, VMware) provide the ability to dynamically migrate virtual machines from one physical machine to another without interrupting application execution. Different products have different capabilities and different performance overheads.

The primary motivation for enterprises to adopt such technologies is increased flexibility, the ability to quickly repurpose server capacity to better meet the needs of application workload owners, amid to reduce overall costs of ownership. Unfortunately, the complexity of these environments presents additional management challenges. There are many workloads, a finite number can be hosted by each server, and each workload has capacity requirements that may frequently change based on business needs. Capacity management methods are not yet available to manage such pools in a cost-effective manner.

In most real-world implementations, various changes concerning a resource pool's operation may occur over time, thus impacting management of its capacity for properly servicing workloads. For instance, changes to the computing resources present in a pool, workloads that are to be serviced by the resource pool, the resource demands of those workloads, and/or operational parameters (e.g., Quality of Service desires, etc.) typically do not remain static, but change over time. For instance, in some cases computing resources are removed from a pool and/or new computing resources are added to the pool. As another example, new workloads are often added over time for service by a resource pool and/or existing workloads may be removed from the pool. In response to such changes, various capacity management operations may be desired. For instance, as the computing resources within a resource pool change (e.g., as resources are removed from the pool and/or new resources are added within the pool), it may become desirable to determine an appropriate distribution of workloads across the resources remaining in the resource pool so as to comply with certain operational parameters (e.g., Quality of Service desires, etc.). Similarly, when a new workload is being added for service by the resource pool, it may become desirable to determine an appropriate assignment of such new workload to resource(s) of the resource pool to provide the respective desired operational parameters for all of the workloads being serviced by the pool. Such capacity management operations become very difficult and time-consuming for system administrators. For instance, system administrators have traditionally been relied upon to have knowledge about the resource demands of the work-loads, the desired operational parameters, and the capacity of computing resources in the resource pool, and to analyze such information to determine an appropriate distribution of the workloads across the computing resources of resource pool that will satisfy the desired operational parameters. As such, system administrators have traditionally been required to manage actions taken within a resource pool for achieving desired operational parameters in servicing workloads, such as by determining a distribution of workloads across the resources of the pool (e.g., assigning individual workloads to individual resources of the pool). For instance, administrators have been responsible for dictating resource-level actions to be taken within a pool, such as specifying to move a workload from one resource to another resource within the pool, etc. in order to manage capacity of the pool. As the computing resources in a resource pool, workloads serviced by a pool, and/or operational parameters change over time, it becomes increasingly difficult, time-consuming, and costly for system administrators to maintain knowledge about these features and determine an appropriate assignment of workloads to computing resources within the pool. Thus, a desire exists for an improved capacity management system that aids a system administrator in achieving desired management operations. Further, a desire exists for a capacity management process for resource pools that allows capacity planners to match supply and demand for resource capacity in a just in time manner.

DETAILED DESCRIPTION

Various embodiments of the present invention are now described with reference to the above figures, wherein like reference numerals represent like parts throughout the several views. As described further below, the present invention provides systems and methods for providing capacity management of resource pools for servicing workloads. According to certain embodiments, a capacity management tool is provided which aids a system administrator in achieving desired management operations. For instance, according to certain embodiments, a capacity management tool enables a user to provide resource pool-level (or "result-oriented") capacity management operation requests, which do not specify details concerning the actions to be taken within a resource pool for achieving such desired operations. For instance, such a capacity management tool may support a request to "Add a Workload", in which the capacity management tool determines a proper assignment of a new workload within a resource pool to satisfy defined operational parameters, such as QoS desires, etc., which may include re-balancing existing workloads across the resources of the resource pool to make sufficient capacity available for the newly added workload. Further, according to certain embodiments, such a capacity management tool allows capacity planners to match supply and demand for resource capacity in a just in time manner.

Thus, as used herein, resource pool-level operations are distinguished from resource-level actions taken within a pool. Examples of a resource pool-level operation is to add/remove a workload to/from the pool, add/remove resources to/from the pool (where workloads may need to be re-balanced within the pool in response thereto), etc. Various other examples of resource pool-level use cases are described herein. On the other hand, resource-level actions concern actions taken within the pool to achieve a pool-level operation, such as an action concerning to which specific resource in the pool a given workload should be assigned for service, etc. As discussed above, administrators (e.g., pool owners) have traditionally been responsible for dictating resource-level actions to perform within a pool in order to manage the pool's capacity for servicing workloads in a desired way (e.g., in accordance with QoS desires, etc.). Embodiments of the present invention advantageously ease the burden on administrators by enabling administrators (or other processes, etc.) to request desired resource pool-level operations, such as Add Workload(s), wherein a capacity management tool determines the appropriate resource-level actions to perform in order to accomplish the desired pool-level operations in accordance with defined operational parameters.

As described further herein, certain embodiments of the present invention pertain to business processes for capacity management services that support automated and semi-automated capacity management for resource pools, such as data centers. According to certain embodiments, a capacity management tool is provided that exploits services for capacity management, such as: workload placement services, demand prediction services, and calendaring, trending and forecasting services. According to certain embodiments, the capacity management tool jointly exploits various capacity management services to reduce the overall costs of capacity management.

Figure 1:
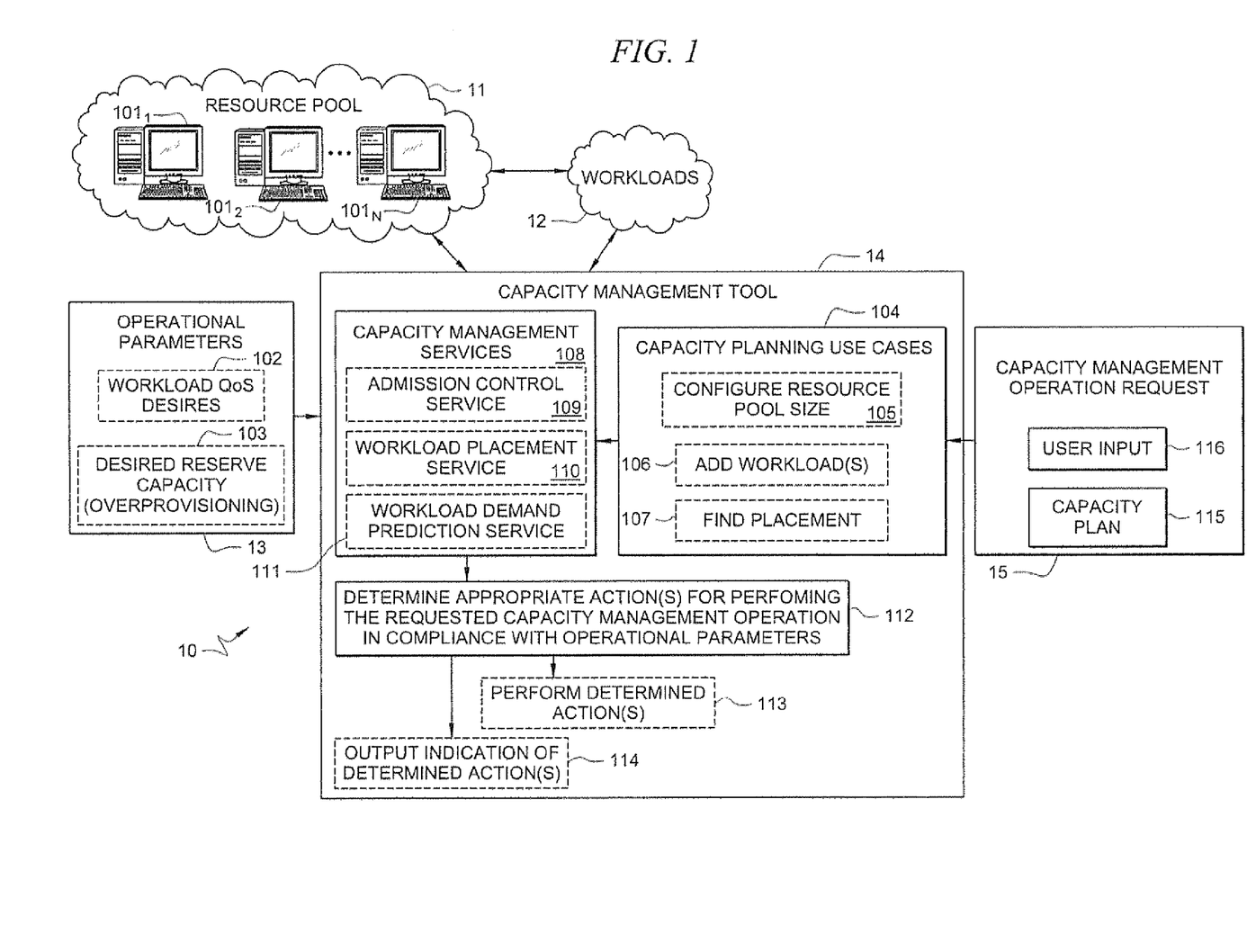
FIG. 1 shows an exemplary system according to one embodiment of the present invention.

FIG. 1 shows an exemplary system 10 according to one embodiment of the present invention. System 10 comprises resource pool 11 that comprises a plurality of resources $101_1$, $101_2, \ldots, 101_N$ (wherein N is any number greater than 1) for servicing workloads 12. In general, resource pool 11 is a collection of computing resources, such as clusters of servers, racks of blades, or other computing resources that offer shared access to computing capacity. Depending on the granularity of a given implementation, a resource pool 11 may be a collection of separate computing devices (e.g., separate servers, separate clusters of servers, etc.) or it may be a collection of resources on a common computing device (e.g., multiple processors on a single server), as examples. For example, resource pool 11 shows a plurality of servers $101_1$-$101_N$, but in other implementations, such resource pool 11 may have a different granularity, i.e., it may have computing resources other than or in addition to servers for serving workloads 12. In certain embodiments, the resources $101_1$-$101_N$ may comprise virtualized resources (e.g., virtual machines, virtual disks). For instance, virtualization services have been developed that offer interfaces that support the lifecycle management (e.g., create, destroy, move, size capacity) of resource containers (e.g., virtual machines, virtual disks) that provide access to shares of resource capacity (e.g., CPU, memory, input/output).

Thus, resource pool 11 comprises a plurality of computing resources $101_1$-$101_N$ for servicing workloads 12. A "computing resource," as used herein, refers to any resource now known or later developed that a consumer utilizes in servicing a workload, including without limitation processing resources (e.g., CPUs), data storage resources (e.g., memory, hard drive, etc.), communication resources (e.g., communication ports, bandwidth, etc.), and input/output (I/O) resources, as examples. The computing resources in pool 11 have capacity attributes, e.g., CPU, memory, I/O operation rates, and bandwidths, each with limited capacity. Accordingly, it becomes desirable to manage the capacity of such resources in pool 11 in order to service the workloads 12 in a desired manner (e.g., in accordance with Quality of Service (QoS) desires 102 and/or other operational parameters 13, as discussed further herein.

Various consumers (e.g., applications) may share access to the resources $101_1$-$101_N$ of resource pool 11. That is, various consumers may share utilization of the computing resources in the resource pool 11 for servicing their respective workloads, shown as workloads 12 in FIG. 1. In this sense, a "consumer" refers to anything (e.g., process, etc.) that consumes capacity of the pool's resources. Thus, a consumer has a corresponding workload that demands capacity of the computing resource(s). Accordingly, a consumer generally consumes capacity for use in servicing the consumer's workload, shown as workloads 12 in FIG. 1. Thus, the consumer has a resource "demand" for capacity from the resource pool for servicing its workload in a desired manner (e.g., in accordance with operational parameters 13, as discussed below). Accordingly, each workload included in workloads 12 that are serviced by resource pool 11 generally have some resource demands for capacity of the resource pool's computing resources for performing the workload's respective tasks.

Generally, it is desirable to manage the capacity of the computing resources in pool 11 in order to service the workloads 12 in accordance with certain operational parameters 13, such as QoS desires 102 defined for the workloads 12. For instance, certain response times and/or other QoS desires such as those related to utilization of resource allocation may be specified in a Service-Level Agreement (SLA), wherein response pool 11 is to service consumer's workloads in accordance with their respective QoS specifications. Such QoS desires 102 may specify different QoS desires for different workloads that are included within workloads 12. As another example, a system administrator may desire to maintain a certain amount of reserve capacity of the computing resources in resource pool 11 (e.g., a certain amount of over-provisioning) to provide "spare" capacity for supporting some amount of unexpected increased demand of the workloads 12. Such "spare" capacity may correspond to a tolerance of the resource pool 11 for unexpected increases in resource demands from the workloads 12 without violating operational parameters 13. Various other operational parameters 13 may exist that define characteristics of service desired by the workloads 12 from the resource pool 11.

In many instances, it is desirable to manage a distribution of the workloads 12 across the computing resources $101_1$-$101_N$ of resource pool 11. That is, it is often desirable to determine a placement of workloads 12 within resource pool 11 (e.g., determine a computing resource of resource pool 11 to which a given workload is to be assigned for service) that will satisfy the operational parameters 13 of the workloads 12. In most real-world implementations, the computing resources present in pool 11, workloads 12 that are to be serviced by the resource pool, the resource demands of those workloads 12, and/or operational parameters 13 typically do not remain static, but change over time. For instance, in some cases computing resources are removed from pool 11 and/or new computing resources are added to pool 11. For example, in some implementations, computing resources are leased for inclusion in a given resource pool 11, and as the lease on computing resources expires, such computing resources may become unavailable to the resource pool 11 (and thus unusable for servicing workloads 12 of the resource pool 11). As another example, new workloads are often added over time to workloads 12 for service by pool 11 and/or existing workloads within workloads 12 may be removed. For example, a data center comprising resource pool 11 may receive new customers and thus add those new customers workloads for service by the data center's resource pool 11. Further still, the resource demands of workloads included in workloads 12 may vary over time. For instance, resource demands a workload of a given website may increase over time as the number of clients who use such website increases. In response, the assignment of computing resources within resource pool 11 may need to be adjusted for the workloads 12 over time in order to maintain the desired operational parameters 13 (e.g., increased capacity may need to be assigned to a workload whose resource demands are increasing).

In response to such changes, various capacity management operations may be desired. For instance, as the computing resources within the resource pool 11 change (e.g., as resources are removed from the pool and/or new resources are added within the pool), it becomes desirable to determine an appropriate distribution of workloads 12 across the resources remaining in the resource pool 11 that complies with operational parameters 13. Similarly, when a new workload is being added to workloads 12 for service by resource pool 11, it becomes desirable to determine an appropriate assignment of such new workload to resource(s) of resource pool 11 to provide the respective desired operational parameters 13 for all of the workloads 12. Such capacity management operations become very difficult and time-consuming for system administrators. For instance, system administrators have traditionally been relied upon to have knowledge about the resource demands of the workloads 12, the desired operational parameters 13, and the capacity of computing resources in the resource pool 11, and to analyze such information to determine an appropriate distribution of the workloads 12 across the computing resources of resource pool 11 that will satisfy the desired operational parameters 13. That is, system administrators have traditionally been required to manage specific resource-level actions taken within a resource pool 11 for performing such capacity management operations as adding a new workload, re-sizing the resource pool, etc. in a manner that achieves desired operational parameters 13 in servicing workloads 12. As the computing resources in resource pool 11, workloads within workloads 12, and/or operational parameters 13 change over time, it becomes increasingly difficult, time-consuming, and costly for system administrators to maintain knowledge about these features and determine an appropriate assignment of workloads to computing resources within pool 11.

Embodiments of the present invention provide a capacity management tool 14 that is operable to aid in the management of a resource pool in order to service its workloads 12 in accordance with operational parameters 13. As described further herein, capacity management tool 14 enables management of resource pool 11 as an entity, thus alleviating a system administrator from having to manage assignment of workloads 12 to individual computing resources included within the resource pool 11 (i.e., alleviating the system administrator from dictating resource-level actions to perform within pool 11 to achieve a desired result, such as adding a workload to the pool, etc., while maintaining compliance with defined operational parameters 13). For instance, according to certain embodiments, capacity management tool 15 enables management of the resource pool capacity at a higher level of abstraction such that a system administrator (or process) can specify a desired capacity management operation (such as adding a workload), and the capacity management tool 15 determines appropriate action(s) to take within the resource pool for achieving the desired capacity management operation (such as determining a resource to which the newly added workload is to be assigned). Thus, a capacity management operation may be specified at a resource pool-level, such as a request to add a workload to the pool, wherein the capacity management tool 14 determines the appropriate resource-level actions to take in order to accomplish the requested pool-level operations in compliance with operational parameters 13.

According to certain embodiments of the present invention, capacity management tool 14 is operable to receive a capacity management operation request 15, which is preferably a resource pool-level request and may be a request for a desired result to be achieved in the pool's operation. For instance, such a request 15 may request any of a number of different capacity planning use cases 104 that are a desired result, such as configuring resource pool size 105 (e.g., adding new resources to the pool 11 and/or removing resources from the pool 11), adding workload(s) 106 that are to be serviced by pool 11 (which may involve such actions as re-balancing existing workloads across resources of pool 11 to enable sufficient capacity to become available for adding a new workload), and find placement 107 (e.g., a request to add a new workload to the resource pool without re-balancing the existing workload assignments). Furthermore, according to certain embodiments, the capacity management operation request 15 may cause the capacity management tool 14 to make changes to the resource pool 11 over time to continuously achieve the desired result. Thus, a request 15 may be a persistent request (as opposed to a transient request) for capacity management tool 14 to monitor the pool 11 and maintain the desired result requested in the pool-level request 15.

According to certain embodiments, the capacity management operation request 15 may be received from a user, such as a system administrator, via user input 116. For instance, a user may interact with a graphical user interface (GUI) of capacity management tool 14 to input a capacity management operation request requesting performance of a capacity planning use case 104, as discussed further herein. In other instances, such capacity management operation request 15 may be received from another software application, or from any other process. In certain embodiments, such capacity management operation request 15 may be received from a capacity plan 115. For instance, as discussed further herein, in certain embodiments a capacity plan 115 may provide a calendar-based data store of planned events, such as planned removal of resources from pool 11 (e.g., expiration of a lease on leased resources in pool 11), addition of resources to pool 11, addition and/or removal of workloads to/from workloads 12, etc., and thus capacity management tool 14 may receive a corresponding capacity management operation request in response to such calendared events.

According to certain embodiments, capacity plan 115 is a calendar-based repository of information that is useful for managing the resource pool 11. It may include past, present, and future information about objects including workloads 12, resources $101_1$-$101_N$ in the resource pool 11, and desired results. Information may be directly contained in the capacity plan 115 or may be references to other IT management systems, where such information can be obtained. The information may include the date and time that an object is planned to be introduced to the resource pool 11 when it is introduced, when it is expected to be removed, and when it is removed. It may further include representative workload demand traces for workloads 12. Such representative workload demand traces may, for example, be historical traces that show the actual resource usage of a workload 12, forecasts, or synthetic traces that act as estimates for demand until more information is known. Resource information may also be included in capacity plan 115, such as measures that describe the capacity of a resource in the resource pool 11 such as CPU, memory, input-output, and network capacity. The capacity may be time varying with patterns expressed using rules well-known to those who schedule meetings with popular e-mail programs. Time-varying capacity for a resource $101_1$-$101_N$ may also be specified using a capacity availability trace that has the same features as a workload demand trace but expresses the time-varying supply of capacity rather than the demand for capacity. The information in or referred to by the capacity plan 115 may also be used to deduce other information such as the best times to make certain chances to achieve desired results for the resource pool 11 to minimize the impact on workloads 12. Thus, for instance, capacity management tool 14 may, in certain embodiments, determine from capacity plan 115 that certain resources are going to be removed from pool 11 on a given upcoming date (e.g., due to their lease expiring, etc.), and therefore capacity management tool 14 may determine that the workloads assigned to such resources will need to be reassigned to some other resources that will remain in the pool 11. Further, capacity management tool 14 may, in certain embodiments, deduce the best time (e.g., the lowest utilization of such workloads, etc.) to move the workloads (e.g., to minimize interruption in service of the workloads) prior to the upcoming date at which the resources will be removed.

Capacity management tool 14 leverages various capacity management services to determine and/or perform the resource-level actions that are appropriate within resource pool 11 for achieving the requested capacity management operation 15 (i.e., the pool-level operation). As discussed further herein, examples of such capacity management services include admission control service 109, workload placement service 110, and workload demand prediction service 111. Exemplary embodiments of such services are described further herein.

Capacity management tool 14 is operable to leverage such capacity management services to, in response to a received capacity management operation request 15, determine appropriate action(s) for performing the requested capacity management operation in compliance with operational parameters 13, in operational block 112. For example, in response to a pool-level capacity management operation request 15 requesting a desired result of adding a workload to workloads 12 (e.g., use case 106), capacity management tool 14 determines, in block 112, the appropriate resource-level actions to take within resource pool 11 for adding the new workload in a way that enables operational parameters 13 to be satisfied for all of workloads 12. The resource-level actions determined may include re-balancing the assignment of the existing workloads across computing resources of resource pool 11 to enable the new workload to be added while providing sufficient capacity to all of workloads 12 so as to satisfy operational parameters 13.

Once the appropriate action(s) for performing a requested capacity management operation is/are determined in block 112, in certain embodiments capacity management tool 14 performs the determined action(s) in operational block 113. For instance, capacity management tool 14 may issue commands for assigning workloads 12 to the appropriate one(s) of resources in resource pool 11. In addition or in alternative, in certain embodiments, capacity management tool 14 may, in operational block 114, output (e.g., to a display, printer, and/or other output device) an indication of the action(s) determined in block 112 (e.g., so that a system administrator may authorize the action(s) to be taken, may manually perform the determined action(s), etc.).

Thus, in certain embodiments, the capacity management operation request 15 is a result-oriented, pool-level request that specifies a desired resulting change to be achieved in operation of resource pool 11, but the request need not specify the resource-level action(s) to be taken within the resource pool 11 for achieving the desired result. Instead, capacity management tool 14 determines, in operational block 112, the appropriate action(s) for performing the requested capacity management operation in compliance with operational parameters 13. Therefore, according to certain embodiments, such capacity management operation requests 15 may be referred to as "resource pool-level" operations (or "result-oriented" operations), wherein the management tool 14 determines (in operational block 112) specific actions to be taken within resource pool 11 for performing the requested resource pool-level operations in a manner that achieves desired operational parameters 13 in servicing workloads 12, such as by determining a distribution of workloads across the resources of the pool. This alleviates the burden from the system administrator in determining the specific resource-level actions that are appropriate to be taken within resource pool 11 in order to perform the pool-level operation. Furthermore, a result-oriented capacity management operation request 15 may cause actions to be taken over time within the resource pool 11 to maintain the desired result, in certain embodiments.

Figure 2:
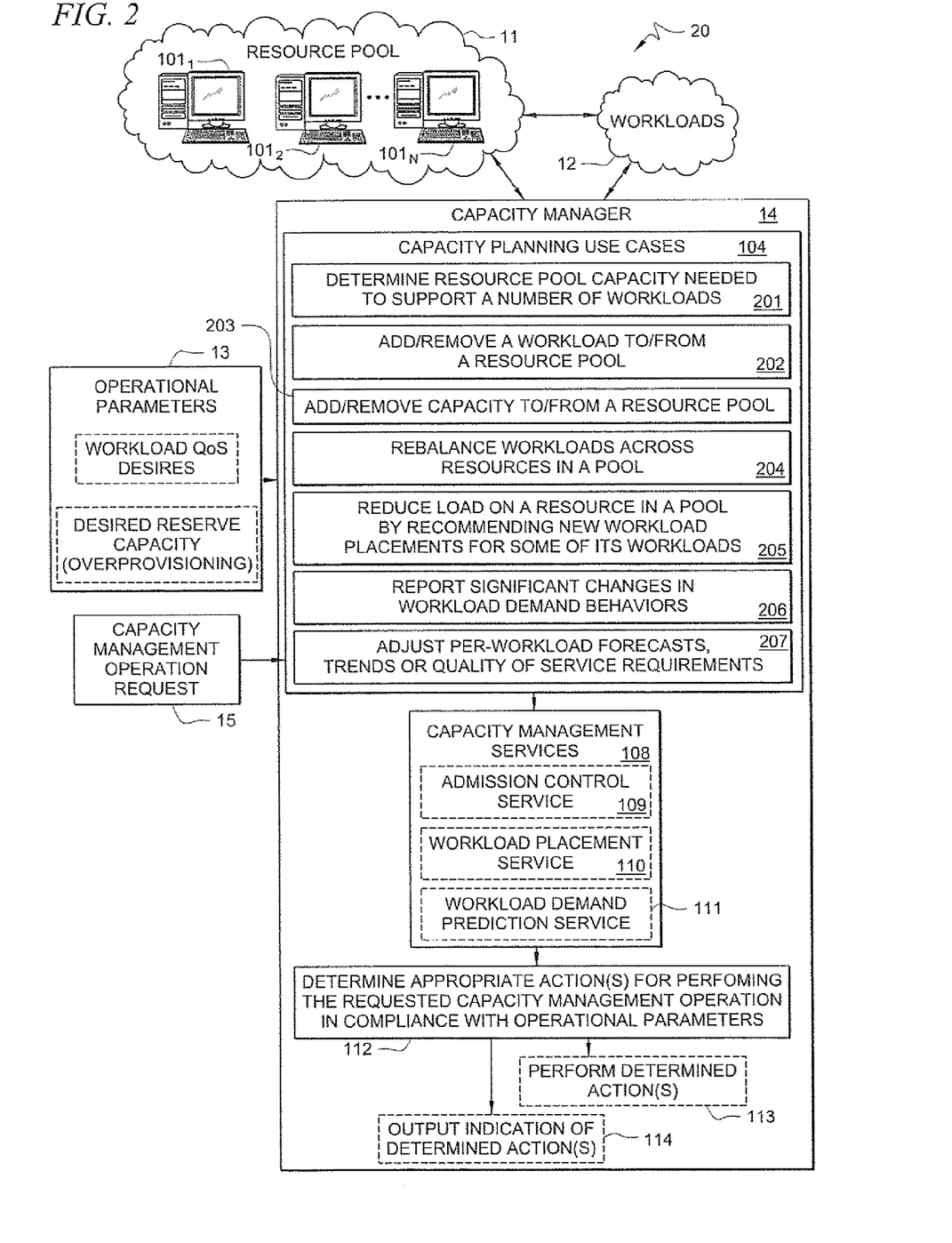
FIG. 2 shows another exemplary system according to an embodiment of the present invention.

Turning to FIG. 2, a exemplary system 20 according to one embodiment of the present invention is shown. System 20 further illustrates exemplary resource pool-level operations (e.g., capacity planning use cases 104) that may be requested in certain embodiments. As shown, such capacity planning use cases 104 (any of which may be requested to be performed via capacity management operation request 15) includes use case 201 for determining resource pool capacity that is needed to support a number of workloads 12. Thus, according to certain embodiments, a capacity management operation request 15 may be received that requests information regarding how much resource pool capacity is needed to support a number of workloads, wherein capacity management tool 14 performs the appropriate action(s) for evaluating the workloads and determining the amount of resource pool capacity needed to support the number of workloads.

Use case 202 is further included for adding/removing a workload to/from resource pool 11. Thus, according to certain embodiments, a capacity management operation request 15 may be received that presents a pool-level request to add or remove a workload to/from resource pool 11, wherein capacity management tool 14 performs the appropriate resource-level action(s) within the pool 11 for adding/removing such workload to/from resource pool 11, which may include re-balancing the workloads 12 across the computing resources of resource pool 11.

Use case 203 is also included for adding/removing capacity to/from resource pool 11. Thus, according to certain embodiments, a capacity management operation request 15 may be received that presents a pool-level request to add or remove capacity to/from resource pool 11 (e.g., computing resources may be added to the pool and/or computing resources may be removed from the pool), wherein capacity management tool 14 performs the appropriate resource-level action(s) within the pool 11, such as re-balancing the workloads 12 across the remaining computing resources of resource pool 11, for performing such request 15 while satisfying operational parameters 13. Further, in certain embodiments, use case 203 may be applied repeatedly according to some user input 116, some calendar based plan 115, or some agent that acts as a user to monitors actual resource usage within the resource pool 11 and decide when fewer or additional resources $101_1$-$101_N$ are needed to achieve the operational parameters 13. This may lead to the ability to reduce power usage for the resource pool 11 or to make some resources $101_1$-$101_N$ available for other purposes such as maintenance or the support of other computations.

Use case 204 is included for rebalancing workloads 12 across resources $101_1$-$101_N$ in pool 11. Thus, according to certain embodiments, a capacity management operation request 15 may be received that presents a pool-level request to rebalance workloads 12 across the computing resources of pool 11, wherein capacity management tool 14 performs the appropriate resource-level action(s) within pool 11 for determining an appropriate distribution of the workloads 12 across the resources of pool 11 and then re-assigns the workloads across the resources in a manner that satisfies operational parameters 13. Use case 204 may, in certain embodiments, be applied periodically to continuously rebalance workloads 12 across resources $101_1$-$101_N$ in pool 11. This may be according to some calendar based plan 115 or some agent that acts as a user to monitor actual resource usage within the resource pool 11 and decides that workloads should be rebalanced.

Use case 205 is included for reducing load on a resource in pool 11 by recommending new workload placements for some of its workloads. Thus, according to certain embodiments, a capacity management operation request 15 may be received that requests a recommendation of workload placements that would reduce the load on the resource pool 11, wherein capacity management tool 14 performs the appropriate action(s) for determining such a workload placement and outputs a recommendation identifying such determined workload placement.

Use case 206 is also included for reporting significant changes in workload demand behaviors. Thus, capacity management tool 14 may monitor the resource demands of the workloads 12 to detect significant behavioral changes (e.g., increases or decreases in resource demands of certain workloads). Capacity management tool 14 may output a notification to a system administrator of a detected behavioral change, which may lead to the system administrator requesting some capacity management operation, such as re-balancing of the workloads. Alternatively, in certain embodiments, capacity management tool 14 may autonomously take certain actions, such as re-balancing, the workloads, in response to detecting significant behavioral changes in the workloads 12 (e.g., such as an amount of change in the resource demands that exceeds a predefined threshold amount).

Finally, use case 207 is included for adjusting per-workload forecasts, trends, or quality of service requirements. Thus, capacity management tool 14 may monitor per-workload forecasts (e.g., as may be defined in a capacity plan 115), resource demand trends (e.g., as may be determined employing such trending techniques as those described in co-pending and commonly assigned U.S. patent application Ser. No. 11/742,525 titled "SYSTEM AND METHOD FOR GENERATING SYNTHETIC WORKLOAD TRACES", and co-pending and commonly assigned U.S. patent application Ser. No. 11/742,519 titled "SYSTEM AND METHOD FOR EVALUATING A PATTERN OF RESOURCE DEMANDS OF A WORKLOAD," as examples), and/or QoS requirements 102 to perform appropriate management actions, such as re-balancing of the workloads, in response thereto. Other adjustments to per-workload forecasts may be based on business information such as the addition of a new business function that is expected to affect the demands of workloads 12, as may be expressed in workload resource demand traces. This information may be conveyed via user input 116 or via some automated methods captured indirectly by reference to other IT management systems through the capacity plan 115, according to certain embodiments.

Figure 3:
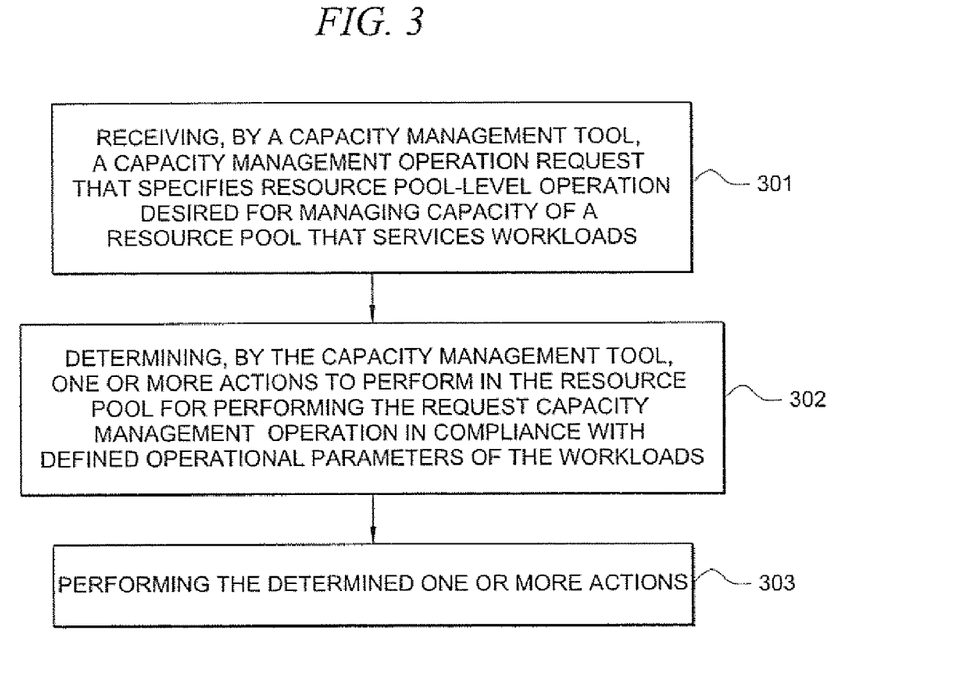
FIG. 3 shows an operational flow diagram according to one embodiment of the present invention.

FIG. 3 shows an operational flow diagram according to one embodiment of the present invention. In operational block 301, capacity management tool 14 receives a capacity management operation request 15 that specifies resource pool-level operation desired for managing capacity of a resource pool 11 that services workloads 12. As discussed above, such a resource pool-level request is a result-oriented request that does not specify the resource-level actions to be taken within the resource pool 11 for achieving the desired result of the request. In operational block 302, the capacity management tool 14 determines, in response to the received request, one or more actions to perform in the resource pool 11 (e.g., resource-level actions) for performing the requested capacity management operation (e.g., a requested use case 104) in compliance with defined operational parameters 13 of the workloads 12. In operational block 303, the determined one or more actions are performed for performing the requested capacity management operation. As discussed above, in certain embodiments, the capacity management tool 14 may perform the determined actions, and/or the capacity management tool 14 may output notification of the determined actions to a system administrator so that the system administrator can perform (or authorize the capacity management tool 14 to perform) the actions in the resource pool. Furthermore, in certain embodiments, the operational flow may be repeated over time to continuously maintain the desired result.

When managing resource pools there are generally numerous capacity management questions that are desirable to have answered to ensure that resources are used effectively. For example: how much capacity is needed to support the current workloads? Which workloads should be assigned to each resource? What is the performance impact of workload scheduler and/or policy settings that govern sharing? How should workloads be assigned to make workload scheduler and/or policy settings most effective? What should be done when a resource doesn't have sufficient capacity to meet its workloads' needs? How many resources will be needed over a planning horizon?

Certain embodiments of the present invention provide a capacity management tool that minimizes the human effort, and hence cost, needed to make best use of data center resources while managing the risks of over and under provisioning. One exemplary embodiment of such a capacity management tool is now described further.

In this exemplary embodiment, the capacity management tool relies on a combination of sub-processes (e.g., capacity management services) that implement various use cases for resource pool operators. Examples of use cases include those exemplary use cases 201-207 shown in FIG. 2.

Before describing techniques for supporting such use cases in this exemplary embodiment, a definition of "required capacity", as used herein, is provided. Required capacity, as used herein, refers to the minimum amount of capacity needed to satisfy resource demands for workloads on a resource. Considering this definition of required capacity, this exemplary embodiment of a capacity management tool implements several capacity management services, including:

an admission control service (see block 109 of FIGS. 1-2),
   a workload placement service (see block 110 of FIGS. 1-2), and
   a workload demand prediction service (see block 111 of FIGS. 1-2).

The admission control service 109, in this exemplary embodiment, decides whether a resource pool 11 has sufficient resources $101_1$-$101_N$ to host a new workload. If so, it recommends which resource (e.g., which server) in the pool the workload should be assigned to. In certain embodiments, workloads that exploit multiple resources are considered as a collection of individual workloads, possibly having workload placement constraints that must be addressed by the workload placement service 110, discussed further below.

The workload placement service 110, in this exemplary embodiment, recommends where to place application workloads among resources (e.g., servers) in the pool 11 to reduce the number of resources (e.g., servers) used or to balance workloads across the resources. In certain embodiments, this workload placement service 110 implements a trace-based approach for characterizing resource demands of the workloads and for recommending solutions. Basically, in such an implementation, each workload is characterized using a time varying trace of resource demands for its key capacity attributes, such as processor usage and memory usage. In certain embodiments, the workload placement service 110 includes greedy algorithms for consolidating workloads onto a small set of resources (e.g., servers) and for balancing the workloads across some fixed number of resources. The workload placement service 110 may also include a genetic algorithm based optimizing search that aims to improve upon the greedy solutions. In each case, the algorithms simulate multiple assignment scenarios. Each scenario considers the placement of zero or more workloads on each resource of the pool (e.g., each server). The aggregate demand of the workloads assigned to a resource (e.g., a server) is characterized using a trace that is the sum of its per-workload time varying demands. The service recommends the best workload placement it can find over all resources (e.g., over all servers of the pool), either for consolidation or for load leveling. Finally, the workload placement service 110 accepts additional constraints on workload placements that include affinity between workloads, e.g., workloads must or must not be placed on the same physical resource (e.g., the same physical server), and affinity between workloads and a list of one or more specific resources (e.g., specific servers).

The workload demand prediction service 111, in this exemplary embodiment, has three purposes:

it aids in recognition of whether a workload's resource demands change significantly over time;

it supports the generation of synthetic resource demand traces that represent future demands expected for each workload to support capacity planning exercises; and, it provides a convenient model that can be used to support forecasting exercises. An exemplary service that implements pattern discovery techniques that may be exploited by certain embodiments of the present invention in order to generate synthetic resource demand traces is described further in co-pending and commonly assigned U.S. patent application Ser. No. 11/742,525 titled "SYSTEM AND METHOD FOR GENERATING SYNTHETIC WORKLOAD TRACES", and co-pending and commonly assigned U.S. patent application Ser. No. 11/742,519 titled "SYSTEM AND METHOD FOR EVALUATING A PATTERN OF RESOURCE DEMANDS OF A WORKLOAD," the disclosures of which are incorporated herein by reference.

In this exemplary embodiment, capacity management tool 14 interacts with a defined capacity management plan 115, which is discussed further above In this exemplary embodiment, capacity management plan 115 is a calendar-based data store that keeps track of such information as: workload identities, forecasts, and resource access QoS requirements 102; resources $101_1$-$101_N$ that are associated with a pool 11; and assignments of workloads 12 to resources of the pool 11. As a calendar-based data store, the capacity plan 115 keeps track of such information as a function of date and time and uses it to support capacity planning.

In general, a resource pool operator typically sizes a resource pool 11 to support certain workloads 12 (i.e., configure resource pool size for workloads), to balance and periodically rebalance the workloads 12 across servers in the pool (i.e., a variant of the Find placement service described herein), and to periodically add/remove workloads and/or resource capacity in response to changing aggregate demand (i.e., the Add workload(s) use ease). Adding a workload may actually imply adding multiple workloads in unison. This corresponds to admitting a distributed application, for example. In this case, the resource demands of each execution server, e.g., web server, application server, database server, of the distributed application is characterized separately using its own workload demand trace. If the resource demands of a workload are not known, then a best estimate for capacity requirements is used to generate a synthetic resource demand trace that is representative of the workload's resource demands. Workload owners may periodically adjust their own business forecasts and/or workload resource access QoS requirements 102 for their workloads 12. Exemplary implementations of the capacity management services that are employed by capacity management tool 14 according to this exemplary embodiment are now described in more detail with reference to FIGS. 4-7.

Figure 4:
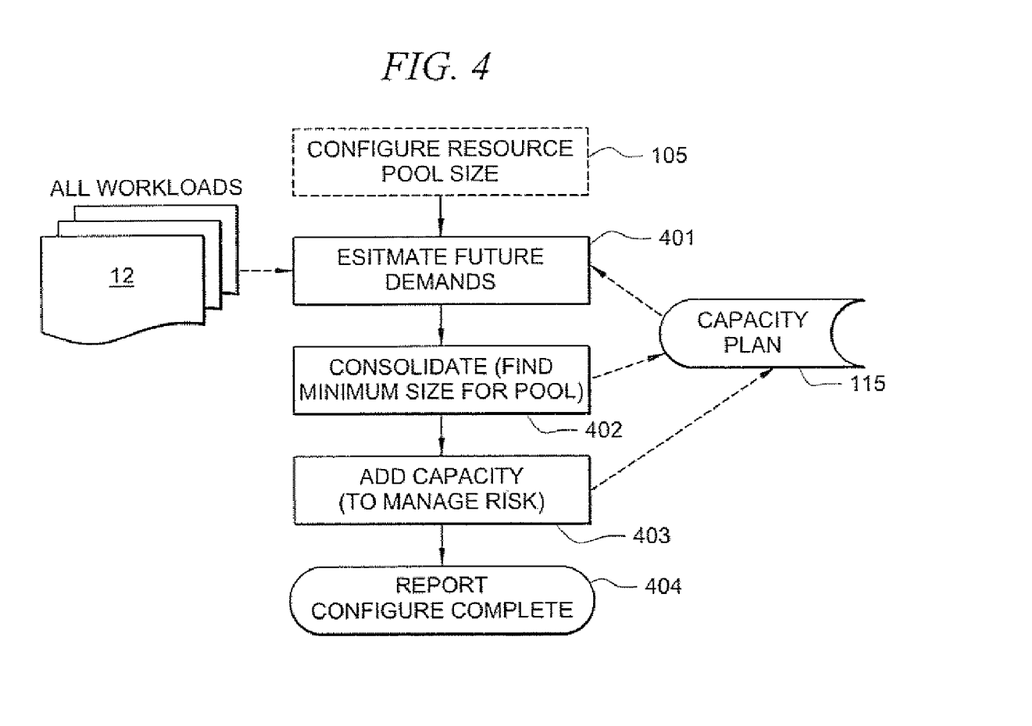
FIG. 4 shows an exemplary operational flow for performing a requested "configure resource pool size for workloads" use case according to one embodiment of the present invention.

FIG. 4 illustrates an exemplary operational flow for performing the requested "configure resource pool size for workloads" use case 105 according to one embodiment of the present invention. This use case 105 is used to find the minimum size of resource pool 11 needed to satisfy a give set of workloads 12. This process may be used when creating a resource pool 11, and/or to periodically reduce performance fragmentation within a resource pool 11, as examples. Reducing fragmentation implies that an alternative workload assignment may better exploit opportunities for resource sharing thereby making more of the existing capacity available for other workloads. According to this exemplary embodiment, the process receives representative resource demands of workloads 12 that are to be serviced by the resource pool 11. Such representative resource demands may be historical resource demand traces of a workload that is included in workloads 12 observed over, say, a preceding 6-month (or other duration) period, or the representative resource demands may comprise synthetic resource demand traces that are representative of the resource demands of a corresponding workload included in workloads 12. The representative resource demands are evaluated in operational block 401 to estimate future resource demands of each workload included in workloads 12. Exemplary techniques that may be employed for estimating future resource demands of a workload based on representative resource demand traces are described further in co-pending and commonly assigned U.S. patent application Ser. No. 11/742,525 titled "SYSTEM AND METHOD FOR GENERATING SYNTHETIC WORKLOAD TRACES", co-pending and commonly assigned U.S. patent application Ser. No. 11/742,519 titled "SYSTEM AND METHOD FOR EVALUATING A PATTERN OF RESOURCE DEMANDS OF A WORKLOAD," and in co-pending and commonly assigned U.S. patent application Ser. No. 11/684,569 titled "SYSTEM AND METHOD FOR CAPACITY PLANNING FOR COMPUTING SYSTEMS", the disclosures of which are hereby incorporated herein by reference. According to certain embodiments, operational block 401 produces synthetic resource demand traces for each of workloads 12 that represents expected resource demands to be encountered for each workload in the future (e.g., based on resource demand trends, such as increasing/decreasing demands, etc., determined for each workload from its corresponding representative resource demand trace).

The capacity plan 115 may include business-related information such as the date when an additional business function or additional users that may cause workload demands to change and an estimate of the impact of the change on demands, e.g., a 10% increase in demands. These affect the estimates for future demands 401. Once a decision is made regarding the number of resources to be used to provide sufficient capacity in Add Capacity 403, this information is recorded in the capacity plan 115 so that it is know to use cases 104 that those resources may be used.

The process 105, in this exemplary embodiment, relies on a consolidation workload placement method 402. The consolidation workload placement method 402 finds combinations of workloads that share resources well subject to placement constraints. It finds a smallest number of resources needed to satisfy operational parameters 102. In certain embodiments, such workload placement service is described in further detail in co-pending and commonly assigned U.S. patent application Ser. No. 11/546,632 titled "DETERMINING FEASIBLE VARIATIONS FOR ASSIGNING APPLICATIONS TO RESOURCES" and co-pending and commonly assigned U.S. patent application Ser. No. 11/492,738 titled "DETERMINING REQUIRED CAPACITY FOR A RESOURCE," the disclosures of which are hereby incorporated herein by reference.

Once the smallest number of resources that is required for supporting the workloads 12 expected future demands is found, a resource pool operator may choose to add additional capacity, in operational block 403, to better deal with resource failures and/or for unexpected resource demands of the workloads. The amount of additional capacity would be based on the success of predicting future demands using past demands for the resource pool and its workloads, and, the risk to the enterprise of not having sufficient capacity. The amount of additional capacity may be expressed as operational parameter 13 desired reserve capacity 103. In operational block 404, the configuration process completes.

Figure 5:
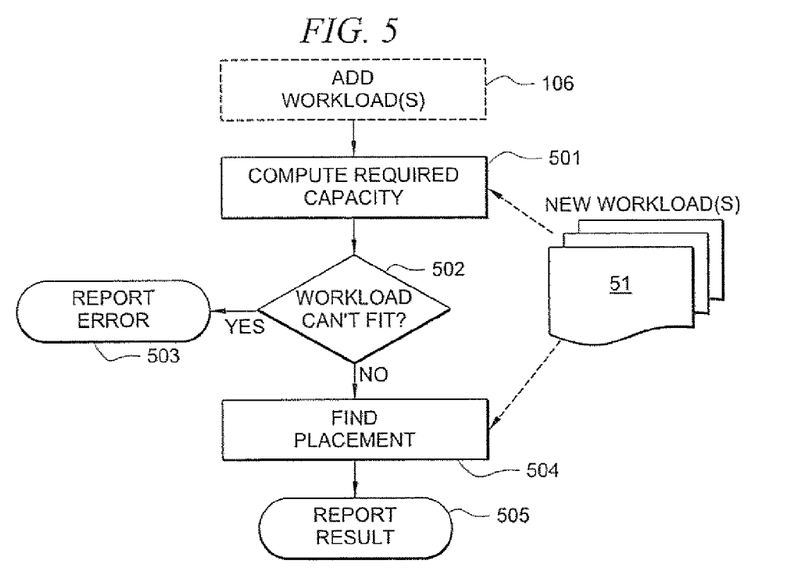
FIG. 5 shows an exemplary operational flow for performing a requested "Add workload(s)" use case according to one embodiment of the present invention.

FIG. 5 illustrates an exemplary operational flow for performing the requested "Add workload(s)" use case 106 according to one embodiment of the present invention. This use case 106 employs an admission control service 109 that aims to add one or more workloads to the resource pool 11. For each new workload to be added 51, capacity management tool 14 checks to ensure that there is some resource type in the pool 11 that is capable of hosting the workload. It makes this check by comparing the required capacity requirement for each capacity attribute of the workload, e.g., CPU, memory, as computed from its workload resource demand trace and workload QoS desire 102 with a corresponding capacity supply for the attribute from the capacity management plan 115 for some resource in the resource pool 11. This determines the feasibility of servicing the workload at all.

Thus, in operational block 501, capacity management tool 11 determines the required capacity for a newly added workload (e.g., either from input from a system administrator that specifies the required capacity, or from an analysis of a representative resource demand trace of the workload the required capacity is determined). In operational block 502, the capacity management tool 11 analyzes the resources in pool 11 to determine whether sufficient capacity exists on a resource for providing the required capacity for the newly added workload. If not, then an error report may be issued in operational block 503. For example, if a new workload requires 100 GB of memory (as determined in block 501) and no resource type, i.e., no resources with common configuration, in the pool 11 has that much memory (as determined in block 502), then the workload cannot be hosted in the pool 11, in which case a failure report is issued in block 503 in this exemplary embodiment. A resource pool operator or workload owner may choose to change the capacity requirements of a workload and try again, in certain embodiments. If all the workloads 51 to be added can fit on resource types in the pool 11, then an attempt is made to find a workload placement for the new workloads by invoking the Find placement use case (discussed below with FIG. 6) in operational block 504, and the result of such Find placement use case may be reported to a system administrator in operational block 505.

Figure 6:
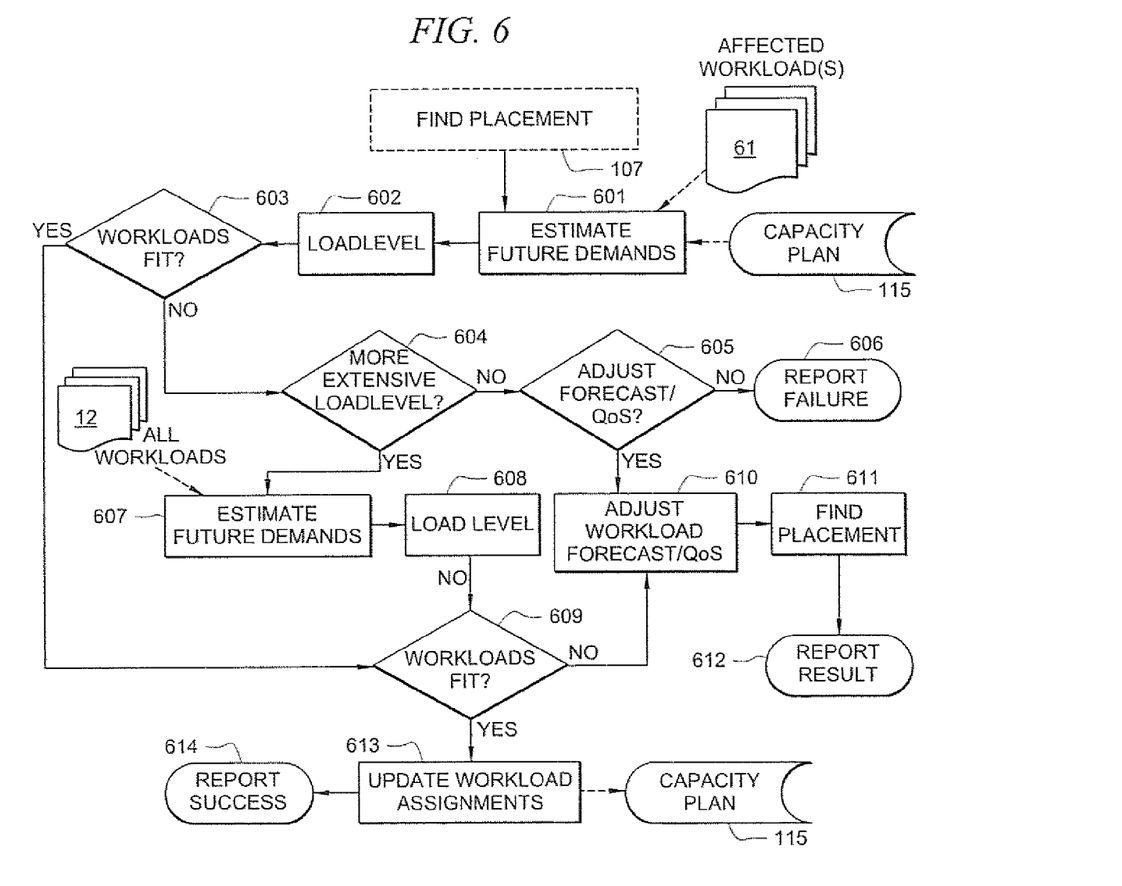
FIG. 6 shows an exemplary operational flow for performing a requested "Find Placement" use case according to one embodiment of the present invention.

An exemplary operational flow for performing a requested "Find Placement" use case 107 according to one embodiment of the present invention is shown in FIG. 6. When Find Placement 107 is invoked, several successive attempts are made to find the workload placement. The successive attempts cause increasing disruption to the resource pool 11 so an early success is preferred. At first, existing workloads are assumed to remain in their current locations. Affected workloads 61 are load-balanced into the pool. Such load-balancing of the affected workloads 61 into the pool includes estimating future demands of those workloads 61 in block 601, performing load-leveling in block 602, and determining in block 603 whether those affected workloads 61 can be added within the pool 11 while existing workloads remain in their current locations within the pool. If the workloads fit, as determined in block 609, then it is possible to update workload assignments 613 in the capacity plan 115 and to report success 614. If not, then some or all of existing workloads 12 may be included in a more extensive load leveling 604 exercise. If this is successful via steps 607 and 608 then it is possible to update workload assignments 613 in the capacity plan 115 and to report success 614. If not or if a more extensive load-leveling is not desired in block 604, and if it is not possible to adjust any workload forecasts or QoS requirements in block 605 then the process reports a failure in block 606; otherwise, after changing the workload forecasts or QoS requirements in block 610 the find placement process is repeated in block 611 and the result reported in block 612.

By default, the exemplary Find placement use case shown in FIG. 6 leaves all existing workloads being serviced by resource pool 11 where they are, but attempts to assign the new workloads to resources in the pool 11 so that the resources are as evenly loaded as possible. If some resource is not able support the resulting capacity requirements, then the Find placement operation may either attempt a larger scale re-balancing of workloads and/or the operator may work with the workload owner to adjust workload forecasts or QoS requirements. These later steps may require effort from the resource pool operator, and so they are preferably only done if necessary. If it is not possible for all the workloads to fit, then either the workload quality of service requirements need to be modified or a report is issued that states that the workloads will not fit. A resource pool operator may choose to add more resource capacity to the pool, if available, to overcome the problem.

The adjust workload forecast/QoS in operational block 610 updates the capacity plan 115. Estimate future demands in operational blocks 601 and 607 may operate as described above in operational block 401 of FIG. 4. In certain embodiments, such estimating of future demands relies on the trending a demand estimation service that is described in further detail in co-pending and commonly assigned U.S. patent application Ser. No. 11/742,525 titled "SYSTEM AND METHOD FOR GENERATING SYNTHETIC WORKLOAD TRACES", and co-pending and commonly assigned U.S. patent application Ser. No. 11/742,519 titled "SYSTEM AND METHOD FOR EVALUATING A PATTERN OF RESOURCE DEMANDS OF A WORKLOAD," the disclosures of which are incorporated herein by reference.

Various other use cases may be supported by capacity management tool 14 according to embodiments of the present invention. Examples of other use cases that may be supported include Add capacity, Remove workload, Remove capacity and Report status, which may all affect or exploit the capacity plan 115. Add capacity is an exemplary use case for adding additional resources to pool 11. Remove workload is an exemplary use case for removing a workload from workloads 12 that are serviced by resource pool 11. Remove capacity is an exemplary use case for removing resources from pool 11. The add capacity and remove workload use cases, as with other use cases, may update the capacity plan 115 at appropriate times in the calendar. These changes are taken into account in later invocations of the Find placement use case described above. The remove capacity use case is more complex. The removal of resources from the pool 11 affects the workloads that are assigned to the resources. These affected workloads are identified by capacity management tool 14 and are then assigned to other resources in the pool 11. An invocation of the Find placement use case causes either new assignments to be found or a report that there is insufficient capacity to host all the workloads with the current resources in a manner that satisfies defined quality of service requirements 102 (and/or other operational parameters 13). Finally, the Report status use case reports events to the resource pool operator to warn of anomalous workload behavior or of the need for additional capacity. Such anomalous behavior may be determined in any of various ways, including techniques described in co-pending and commonly assigned U.S. patent application Ser. No. 11/742,519 titled "SYSTEM AND METHOD FOR EVALUATING A PATTERN OF RESOURCE DEMANDS OF A WORKLOAD," for example.

According to this exemplary embodiment, a workload demand prediction service 111 is exploited as part of the capacity management processes performed by capacity management tool 14. In so doing, this exemplary embodiment of capacity management tool 14 conducts a walk-forward test over representative resource demand traces of the workloads (e.g., historic resource demand traces observed over a period of, say, the preceding 6 months) to emulate how well the capacity management process would have served the data center for the six months. An example of such a walk-forward test that may be employed is as follows:

Starting with the first week, a window with it, weeks of data is used to recommend a consolidated configuration $C_1$, i.e., each workload is assigned to a specific server, for the system. The configuration reports expected required capacity values for each server in the configuration.

The next y weeks of data are then simulated with respect to $C_1$. This simulation gives the actual required capacity for the next y weeks.

The difference between a server's actual and estimated required capacity gives the absolute error for the estimate of required capacity for $C_1$.

The steps in the walk-forward test are repeated iteratively with w weeks of data, but now starting with successive weeks of weeks 2, 3 and so on.

Let i be the step number in the walk-forward test. Step i computes a new configuration Ci and a new set of differences between estimated and actual required capacity values for each server.

Figure 7:
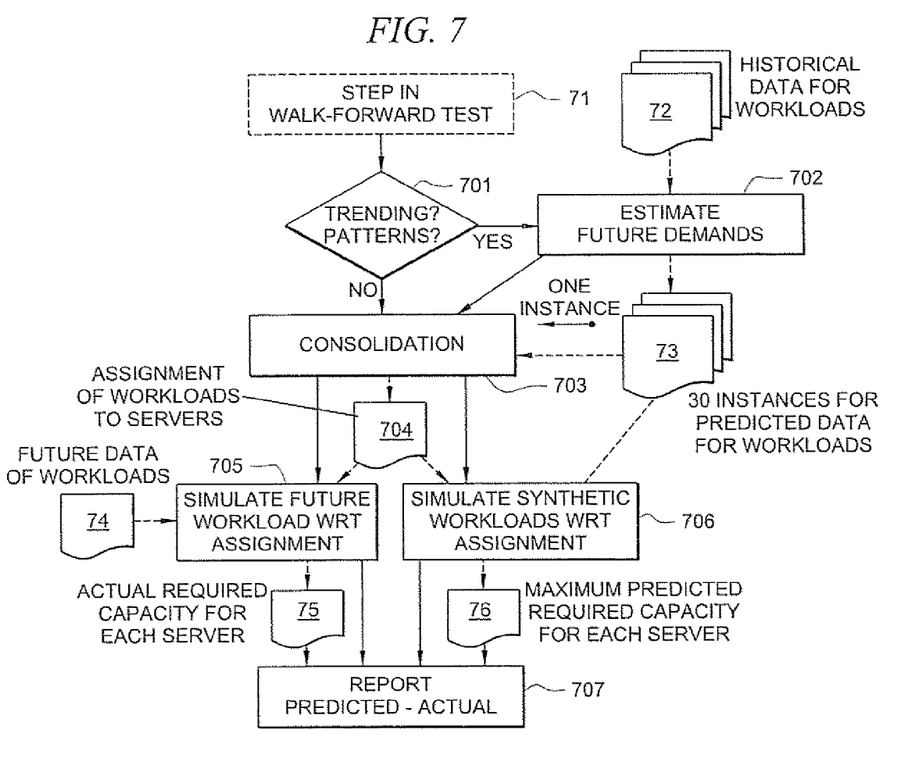
FIG. 7 shows an exemplary process employed for each step in a walk-forward test according to one embodiment of the present invention.

FIG. 7 shows an exemplary process employed for each step i in the walk-forward test 71 according to one embodiment of the present invention. Step 701 decides whether to exploit trends that can be observed from historical data for workloads, workload demand traces 72, if so then the historical traces are updated to reflect the impact of the trends on demand values in the traces. Multiple instances 73, e.g., 30, of a synthetically generated workload are generated for each workload. Such synthetically generated workloads 73 are generated based on estimation of future demands (block 702) determined from the historical resource demands 72 of the workloads. A consolidation step 703 uses one of the synthetic traces for each workload 12 to recommend a workload placement that consolidates the workloads to a small number of resources while satisfying operational parameters 102. This computes a number of resources that will be used to service the workloads 12 and a required capacity value for each capacity attribute for each resource, shown as assignment of workloads to servers 704. In one embodiment, the remainder of the synthetically generated workload demand traces are then simulated with respect to this same configuration 706. The greatest required capacity, for each capacity attribute such as CPU, memory, etc., for each resource over all of the synthetic traces gives an estimate for the required capacity for each resource. In another embodiment the consolidation process is repeated for each of the multiple instances, e.g., 30, of the synthetically generated workloads. The configuration with the greatest number of resources and greatest overall required capacity may be chosen as the configuration for the resource pool 11. The computations for required capacity for resources can be compared with a computation for required capacity 705 based on future data of workloads 74. A report of predicted versus actual required capacity 707 can report on differences between predictions for required capacity (76) versus the actual value for required capacity (75) as observed from subsequent values in the workload demand traces 72. By considering multiple instances 73 of a synthetic workload, this process estimates multiple predictions for required capacity each of which is an equally likely outcome, thus it is possible to report a range of possible future behaviors for the resource pool and to further assess the risk that actual required capacity will exceed predicted required capacity.

For each step in the test, 30 synthetic workload traces (73) are generated per workload that predict future demands. Again, such instances of synthetic workload traces may be generated employing techniques described further in co-pending and commonly assigned U.S. patent application Ser. No. 11/742,525 titled "SYSTEM AND METHOD FOR GENERATING SYNTHETIC WORKLOAD TRACES", and co-pending and commonly assigned U.S. patent application Ser. No. 11/742,519 titled "SYSTEM AND METHOD FOR EVALUATING A PATTERN OF RESOURCE DEMANDS OF A WORKLOAD," the disclosures of which are incorporated herein by reference.

In one embodiment, one of these instances is chosen arbitrarily and used as input to the workload placement recommendation algorithm which consolidates, in operational block 703, workloads to recommend a configuration. The multiple instances of the synthetic traces are simulated with respect to the configuration (in operational blocks 705 and 706). For each simulation, an estimate for the required capacity for each server is obtained (shown as actual required capacity 75). The largest estimate for required capacity for a server over all synthetic trace instances is then taken as a prediction for the required capacity for the server (shown as maximum predicted required capacity for each server 76). Next, we simulate the actual future workload data with respect to the configuration. For each server, we compare the predicted required capacity, from our synthetic workload traces, with the actual required capacity, from the actual future data. In another embodiment, the consolidation process is repeated for each of the multiple sets of workload traces 73. The consolidation 703 that yields the configuration with the greatest number of resources and the greatest overall required capacity is used as the recommended configuration for the system 704. The other sets of synthetic workload traces 73 are then simulated with respect to the assignment 706. Next, we simulate the actual future workload data with respect to the configuration. For each server, we compare the predicted required capacity, from our synthetic workload traces, with the actual required capacity, from the actual future data.

Accordingly, the above-described exemplary embodiment of capacity management tool 14 relies on the various subprocesses that have been described to aid a resource pool operator (or system administrator) to manage capacity of a resource pool 11 for serving workloads 12 in compliance with operational parameters 13. As discussed above, in accordance with embodiments of the present invention, the resource pool operator is not required to specify detailed actions that are to be taken within the resource pool 11 for achieving the desired capacity management. Instead, the capacity management tool 14 abstracts the resource pool 11 for management as an entity so that the resource pool operator can request management-level (or result-oriented) capacity management operations, such as Add Workload, etc., and the capacity management tool 14 leverages the capacity management services (described above) to determine the actions to take within the resource pool 11 to perform the requested management-level capacity management operations. Some of the steps in the above-described processes may require resource pool operator or workload owner intervention or may be policy driven. It is expected that processes will support a greater Information Technology service delivery framework. Automated analysis methods are responsible for performing such capacity management tasks as:

recommending workload placements,
predicting workload demands into the future,
reporting when the behavior of workloads incur significant change,
reporting whether there is sufficient capacity to add an additional workload,
supporting a new forecast for a workload, and
predicting the date when additional capacity will be needed.

By exploiting the above-mentioned capacity management processes/services the resource pool operator is able to look at the combined resources as a single pool 11, thereby reducing the cost and complexity of management while ensuring best use of the pool's (e.g., a data center's) resources.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and or the like) or communicated via a data signal from a communication medium (e.g., the Internet). In fact, readable media can include any medium that can store or transfer information.

Figure 8:
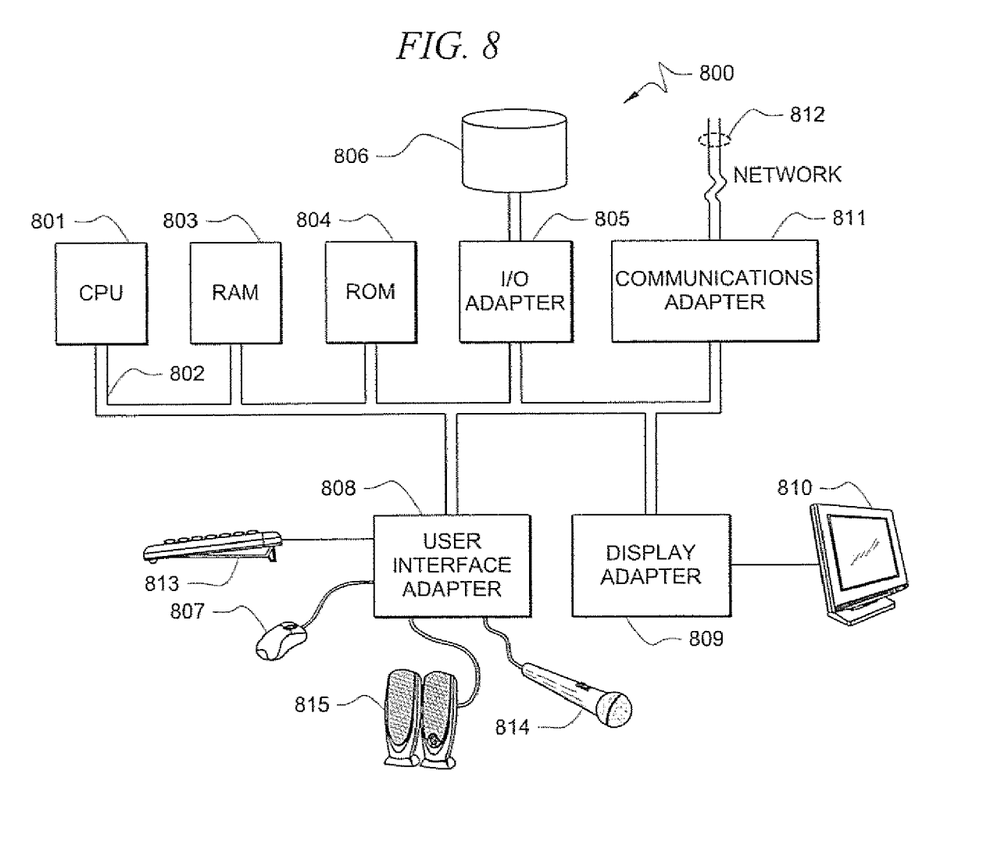
FIG. 8 shows an exemplary computer system on which a capacity management tool may be implemented according to certain embodiments of the present invention.

FIG. 8 illustrates an exemplary computer system 800 on which capacity management tool 14 may be implemented according to certain embodiments of the present invention. Central processing unit (CPU) 801 is coupled to system bus 802. CPU 801 may be any general-purpose CPU. The present invention is not restricted by the architecture of CPU 801 (or other components of exemplary system 800) as long as CPU 801 (and other components of system 800) supports the inventive operations as described herein. CPU 801 may execute the various logical instructions according to embodiments of the present invention. For example, CPU 801 may execute machine-level instructions according to the exemplary operational flows described above in conjunction with FIGS. 3-7.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as capacity management operation requests 15 and/or operational parameters 13.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for operations of the capacity management tool 14. Communications adapter 811 is preferably adapted to couple computer system 800 to network 812, which may enable information to be input to and/or output from system 800 via such network 812 (e.g., the Internet or other wide-area network, a local-area network, a public or private switched telephony network, a wireless network, any combination of the foregoing). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display determined action(s) for performing a requested capacity management operation (see block 114 of FIGS. 1-2) and/or other requested information pertaining to capacity planning/management for a resource pool 11, according to certain embodiments of the present invention.

It shall be appreciated that the present invention is not limited to the architecture of system 800. For example, any suitable processor-based device may be utilized for implementing capacity management tool 14, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:
1. A method comprising:
receiving, by a capacity management tool, a capacity management operation request that specifies a resource pool-level operation desired for managing capacity of a resource pool that services workloads, including a request to remove at least one resource from the resource pool, wherein said capacity management tool interacts with a calendar-based capacity plan, wherein said capacity management operation request is received from the calendar-based capacity plan;
determining, by the capacity management tool, in response to the received request, one or more actions to perform in the resource pool for performing the requested capacity management operation in compliance with defined operational parameters of the workloads wherein, for workloads assigned to the at least one resource to be removed from the resource pool, determining to which one or more remaining resources in the resource pool such workloads should be re-assigned to enable all workloads being serviced by the resource pool to comply with their respective defined operational parameters; and performing the determined one or more actions for performing the requested capacity management operation.

2. The method of claim 1 wherein said determining comprises:

determining one or more resource-level actions to perform in the resource pool for accomplishing the requested capacity management operation.

3. The method of claim 1 wherein said capacity management operation request further comprises:

a request to add at least one workload to the resource pool.

4. The method of claim 3 wherein in response to said request to add at least one workload to the resource pool said determining further comprises:

determining to which one or more of resources in the resource pool the at least one workload to be added to the resource pool should be assigned to enable all workloads being serviced by the resource pool to comply with their respective defined operational parameters.

5. The method of claim 1 wherein said capacity management operation request is a persistent request.

6. Computer-executable software code stored on a non-transitory computer-readable medium, which when executed by a computer causes the computer to perform a method comprising:

receiving, utilizing a capacity management tool, a capacity management operation request that specifies a resource pool-level operation desired for managing capacity of a resource pool that services workloads, including a request to remove at least one resource from the resource pool, wherein said capacity management tool interacts with a calendar-based capacity plan, wherein said capacity management operation request is received from the calendar-based capacity plan;

determining, in response to the received request, one or more actions to perform in the resource pool for accomplishing the requested capacity management operation in compliance with defined operational parameters of the workloads wherein, for workloads assigned to the at least one resource to be removed from the resource pool, determining to which one or more remaining resources in the resource pool such workloads should be re-assigned to enable all workloads being serviced by the resource pool to comply with their respective defined operational parameters; and performing the determined one or more actions for accomplishing the requested capacity management operation.

7. The computer-executable software code of claim 6 wherein said capacity management operation request further comprises:

a request to add at least one workload to the resource pool.

8. The computer-executable software code of claim 7 wherein in response to said request to add at least one workload to the resource pool said determining further comprises:

determining to which one or more of resources in the resource pool the at least one workload to be added to the resource pool should be assigned to enable all workloads being serviced by the resource pool to comply with their respective defined operational parameters.

9. The computer-executable software code of claim 6 wherein said receiving comprises receiving any one or more capacity management operation request selected from the following:

request to determine resource pool capacity needed to support a number of workloads, request to add a workload to the resource pool, request to remove a workload from the resource pool, request to add capacity to the resource pool, request to rebalance workloads across resources in the pool, and request for new workload placements within the resource pool that will reduce the load on at least one specified resource in the pool.

10. A system comprising:

a resource pool comprising a plurality of computing resources for servicing workloads;

a capacity management tool including computer executable instructions stored to a non-transitory computer readable medium that are executed by a processor to receive a capacity management operation request that specifies a resource pool-level operation desired for managing capacity of the resource pool, including a request to remove at least one resource from the resource pool, wherein said capacity management tool interacts with a calendar-based capacity plan, wherein said capacity management operation request is received from the calendar-based capacity plan;

said capacity management tool operable to determine, in response to the received request, one or more actions to perform in the resource pool for accomplishing the resource pool-level operation specified by the requested capacity management operation in compliance with defined operational parameters of the workloads wherein, for workloads assigned to the at least one resource to be removed from the resource pool, determining to which one or more remaining resources in the resource pool such workloads should be re-assigned to enable all workloads being serviced by the resource pool to comply with their respective defined operational parameters.

11. The system of claim 10 wherein said capacity management tool is further operable to perform at least one of the following:

autonomously perform the determined one or more actions for accomplishing the resource pool-level operation specified by the requested capacity management operation, and output information identifying the determined one or more actions.

12. The system of claim 10 wherein said capacity management pool is operable to receive any one or more capacity management operation request selected from the following:

request to determine resource pool capacity needed to support a number of workloads, request to add a workload to the resource pool, request to remove a workload from the resource pool, request to add capacity to the resource pool, request to rebalance workloads across resources in the pool, and request for new workload placements within the resource pool that will reduce the load on at least one specified resource in the pool.

13. The system of claim 10 wherein said capacity management operation request further comprises:

a request to add at least one workload to the resource pool.

14. The system of claim 13 wherein, in response to said request to add said at least one workload to the resource pool, said capacity management tool is operable to determine to which one or more of resources in the resource pool the at least one workload to be added to the resource pool should be assigned to enable all workloads being serviced by the resource pool to comply with their respective defined operational parameters.

* * * * *